United States Patent
Smith et al.

(10) Patent No.: US 7,541,795 B1
(45) Date of Patent: Jun. 2, 2009

(54) APPARATUS AND METHOD FOR START-UP AND OVER-CURRENT PROTECTION FOR A REGULATOR

(75) Inventors: Gregory J. Smith, Tucson, AZ (US); Glenn Chance Dunlap, III, Tucson, AZ (US); Jeremy A. Carlson, Tucson, AZ (US); Igor Furlan, Sunnyvale, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 448 days.

(21) Appl. No.: 11/351,079

(22) Filed: Feb. 9, 2006

(51) Int. Cl.
*G05F 1/40* (2006.01)
(52) U.S. Cl. .................. 323/285; 323/283; 323/901
(58) Field of Classification Search .................. 363/222, 363/283, 284, 285, 288, 290, 901, 908; 361/93.9, 361/94, 96
See application file for complete search history.

(56) References Cited

U.S. PATENT DOCUMENTS 5,657,220 A * 8/1997 Yan ............................ 363/132

6,498,528 B2 * 12/2002 Inagaki et al. ............... 327/541
6,836,393 B2 * 12/2004 Kaneko et al. ................ 361/18

OTHER PUBLICATIONS

LM2645, "Advanced Two-Phase Switching Controller with Two Linear Outputs," National Semiconductor Corporation, pp. 1-20 (2005), no month.
LM2642, "Two-Phase Synchronous Step-down Switching Controller," National Semiconductor Corporation, pp. 1-21 (2006), no month.

* cited by examiner

*Primary Examiner*—Jessica Han
(74) *Attorney, Agent, or Firm*—Darby & Darby P.C.; Matthew M. Gaffney

(57) ABSTRACT

A regulator is provided. In one embodiment, the regulator operates as follows. During steady-state conditions, the switching frequency is maintained substantially constant. During start-up and/or in response to an over-current event, the reference voltage is attenuated. For example, in one embodiment, during a soft-start, the reference voltage ramps upward. During the soft-start, the switching frequency is attenuated in proportion to the attenuation of the reference voltage. The switching frequency is attenuated by skipping a number of pulses that is proportional to the reference voltage attenuation, or through another method. In another embodiment, a dynamic over-current protection scheme is employed.

20 Claims, 7 Drawing Sheets

APPARATUS AND METHOD FOR START-UP AND OVER-CURRENT PROTECTION FOR A REGULATOR

FIELD OF THE INVENTION

The invention is related to switching regulators, and in particular, to an apparatus and method for a switching regulator controller which employs dynamic over-current protection and/or switching frequency attenuation based on the reference voltage attenuation during start-up and/or during over-current protection.

BACKGROUND OF THE INVENTION

A switching regulator may be configured to provide an output voltage (Vout) in response to an input voltage (Vin). Typically, a switching regulator includes an inductor that is coupled to a switch. In operation, the inductor current is a triangle wave current based on the opening and closing of the switch, and an output capacitor provides Vout from the inductor current. Also, the switch is controlled by a control signal, where the duty cycle or the frequency of the control signal is typically modulated based on negative feedback.

Additionally, a diode-rectified switching regulator employs a diode to, inter alia, rectify the inductor current. A synchronous switching regulator employs a synchronous switch rather than a diode. In a synchronous switching regulator, the inductor current can be positive or negative. Additionally, other topologies may be employed, such as a SEPIC topology or a CUK topology.

BRIEF DESCRIPTION OF THE DRAWINGS

Non-limiting and non-exhaustive embodiments of the present invention are described with reference to the following drawings, in which.

DETAILED DESCRIPTION

Figure 1:
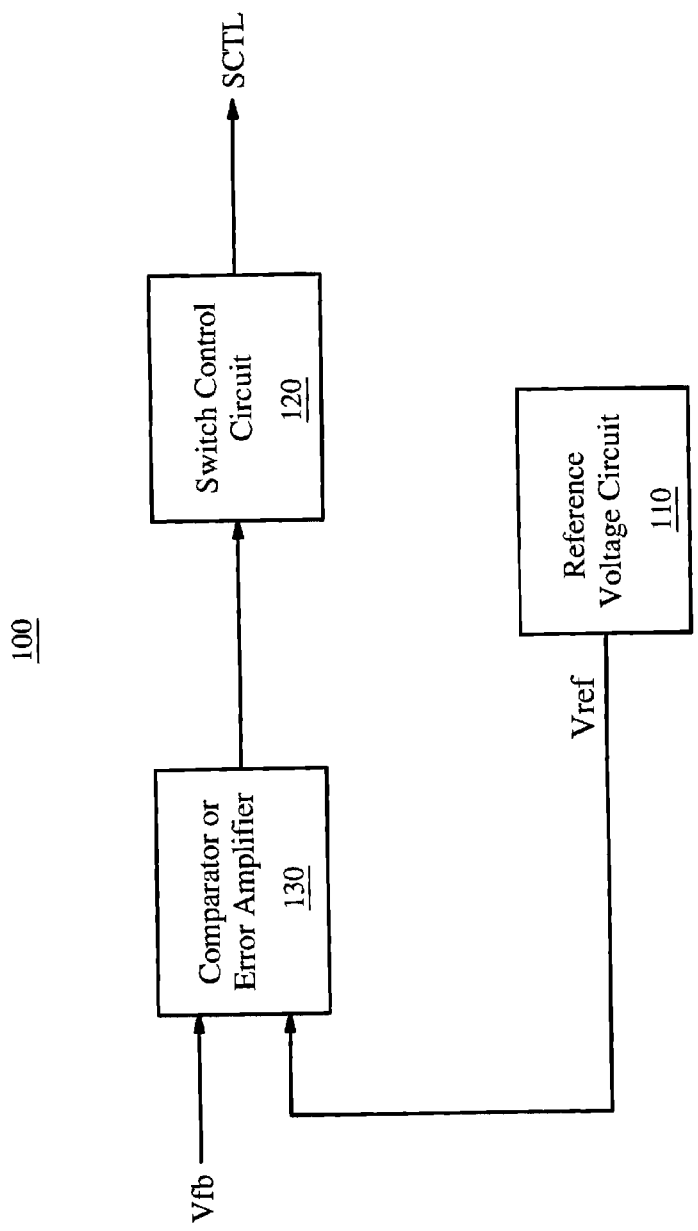
FIG. 1 illustrates an embodiment of a regulator controller.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal. Where either a field effect transistor (FET) or a bipolar transistor may be employed as an embodiment of a transistor, the scope of the words "gate", "drain", and "source" includes "base", "collector", and "emitter", respectively, and vice versa.

Briefly stated, the invention is related to a regulator.

In one embodiment, the regulator operates as follows. During steady-state conditions, the switching frequency is maintained substantially constant. During start-up and/or in response to an over-current event, the reference voltage is attenuated. For example, in one embodiment, during a soft-start, the reference voltage ramps upward. During the soft-start, the switching frequency is attenuated in proportion to the attenuation of the reference voltage. The switching frequency is attenuated by skipping a number of pulses that is proportional to the reference voltage attenuation, or through another method.

In another embodiment, a dynamic over-current protection scheme is employed. In yet another embodiment, both the switching frequency attenuation in proportion to the reference voltage attenuation and the dynamic over-current protection are employed.

FIG. 1 illustrates an embodiment of switching regulator controller 100. Switching regulator controller 100 includes reference voltage circuit 110, switch control circuit 120, and comparator or error amplifier 130.

In operation, reference voltage circuit 110 provides reference voltage Vref. Also, in one embodiment, reference voltage circuit 110 is operable attenuate reference voltage Vref during soft-start and/or in response to an over-current event. In one embodiment, when switching regulator controller 100 is powered on, reference voltage Vref ramps upward from zero to a steady-state value.

In one embodiment, regulator controller 100 does not have over-current protection. In another embodiment, if an over-current event occurs, reference voltage Vref is re-set to zero, and then the voltage ramps upward from zero to the steady-state value. In yet another embodiment, if an over-current event occurs, reference voltage Vref is dynamically adjusted in response to the over-current event, as explained in greater detail below.

In one embodiment, reference voltage circuit 110 provides a voltage ramp during soft-start through analog means. For example, in one embodiment, the voltage ramp may be generated by providing a current to a capacitor (not shown). In another embodiment, reference voltage circuit 110 generates a voltage ramp during soft-start through digital means. For example, in one embodiment, the voltage ramp may be provided based on a counter and a digital-to-analog converter (DAC) (not shown in FIG. 1).

In one embodiment, block 130 is an error amplifier. In this embodiment, error amplifier 130 provides an error signal that is proportional to the difference between feedback voltage Vfb and reference signal Vref. In another embodiment, block 130 is a comparator. In this embodiment, comparator 130 provides a comparator output signal based on a comparison of feedback voltage Vfb with reference voltage Vref.

In any case, feedback voltage Vfb is based on an output voltage and/or a load current. In one embodiment, voltage Vfb is provided by a voltage divider that is coupled to the output voltage.

Switch control circuit 120 is operable to provide switch control signal SCTL based, in part, on the output of block 130. Further, switch control signal SCTL may be provided to a switch to enable voltage regulation. During steady-state conditions, switch control circuit 120 provides switch control signal SCTL such that the frequency of switch control signal SCTL is approximately constant.

In one embodiment, during soft-start and/or in response to an over-current event, switch control circuit 120 is operable to attenuate the switching frequency (i.e. the frequency of switch control signal SCTL) based on the reference voltage attenuation. In one embodiment, during soft-start, the switching frequency is attenuated in proportion to the reference voltage attenuation such that the on-time of pulses of signal SCTL is substantially constant during the soft start.

In one voltage-mode control embodiment, block 130 is an error amplifier that provides an error voltage, and switch control circuit 120 performs pulse width modulation on the error voltage to provide switch control signal SCTL. In one current-mode control embodiment, switch control signal SCTL is provided based on both the error voltage and sensed current.

In another embodiment, switching regulator controller 100 may control adaptive, feed-forward constant-on-time switching regulation, in which the on-time is modulated based on the ratio of the output voltage to the input voltage. In this embodiment, even though a constant on-time type architecture is employed, the adaptive adjustment of the on-time is employed such that the frequency of switch control signal SCTL is approximately constant during steady-state conditions. During soft-start and/or in response to an over-current event, switch control circuit 120 may be operable to attenuate the switching frequency based on the reference voltage attenuation.

In another embodiment, switching regulator controller 100 controls adaptive hysteric control in which the hysteresis is adjusted based on the ratio of the output voltage to the input voltage such that the frequency of switch control signal SCTL is approximately constant during steady-state conditions. During soft-start and/or in response to an over-current event, switch control circuit 120 may be operable to attenuate the switching frequency based on the reference voltage attenuation.

In one embodiment, switch control circuit 120 attenuates the switching frequency by skipping pulses in proportion to the reference voltage attenuation. In another embodiment, switch control circuit 120 performs pulse width modulation based on a clock signal, and the frequency of the clock signal is modulated such that the frequency of the clock signal is attenuated in proportion to the reference voltage attenuation.

In one embodiment, switch control circuit 120 does not perform switching frequency attenuation, but it does perform dynamic over-current protection, as follows. If an over-current protection event occurs, and the reference voltage is not at a minimum voltage level, the reference voltage is decremented. In this embodiment, there are at least three levels for the over-current protections: the final steady-state voltage level at which the reference voltage reaches if no over-current protection events occur, the minimum voltage level for the reference voltage (e.g. 0V) that the reference voltage will drop to if over-current events persist, and at least one voltage level that is in between the final voltage level and the minimum voltage. In one embodiment, there are eight voltage levels for the over-current protection. However, the invention is not so limited, and virtually any number of voltage levels may be employed. If an over-current event occurs, the reference voltage is dropped almost immediately to a lower over-current protection voltage level. If the over-current event is detected again at the lower level, the reference voltage drops again. This continues until either the minimum voltage level is reached, or until no over-current protection event is detected. If no over-current protection event is detected, the reference voltage then soft-starts toward the final voltage level. This continues until either the final voltage level is reached, or another over-current event occurs. One embodiment of a dynamic over-current protection algorithm is described below with reference to FIG. 5.

In another embodiment, switch control circuit 120 does not provide dynamic over-current protection, but does provide switching frequency attenuation in proportion to the reference voltage attenuation. In yet another embodiment, switch control circuit 120 performs both dynamic over-current protection and switching frequency attenuation.

Figure 2A:
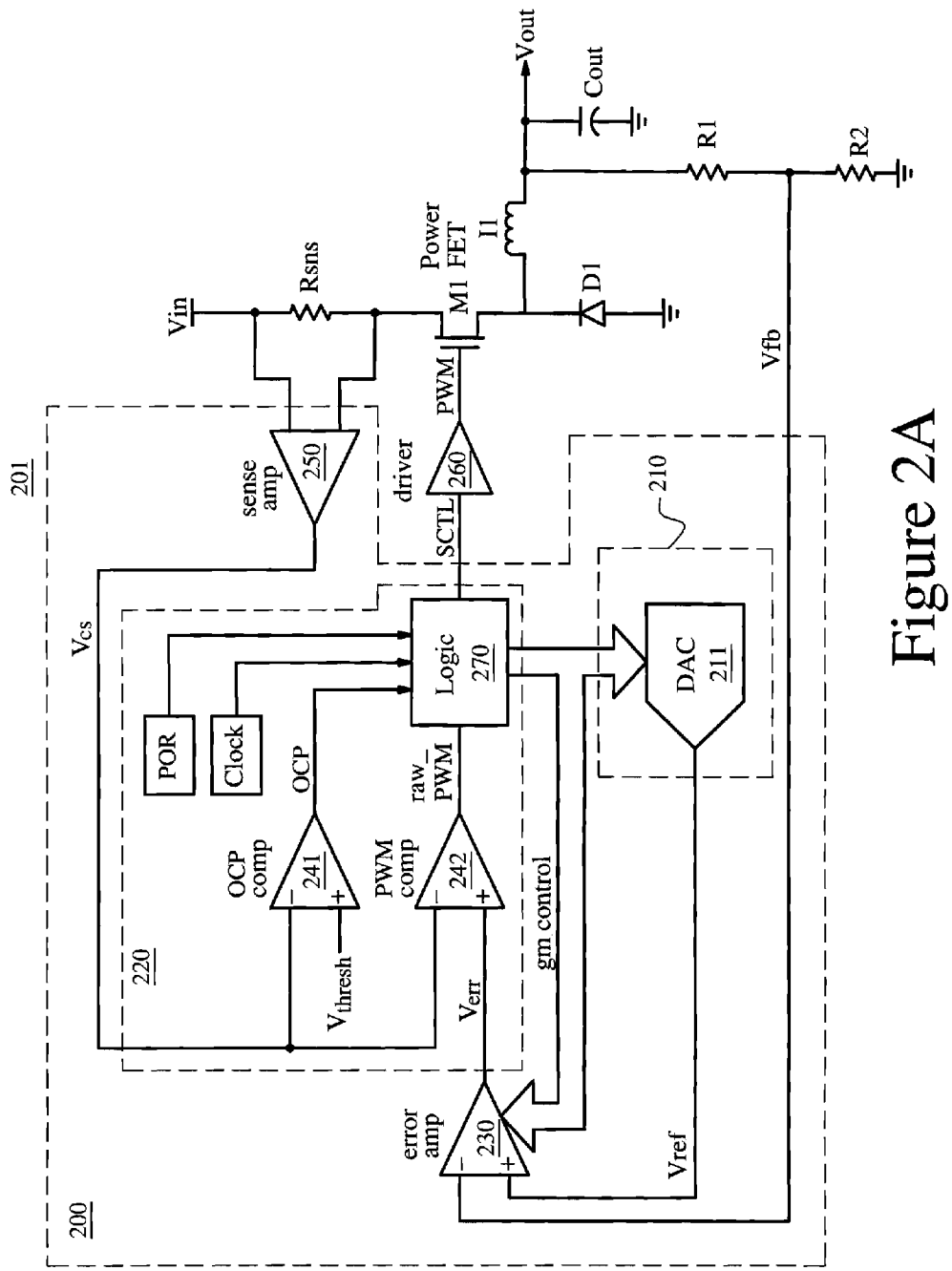
FIG. 2A shows a block diagram of an embodiment of switching regulator that includes an embodiment of the regulator controller of FIG. 1.

FIG. 2A shows a block diagram of an embodiment of switching regulator 201. Switching regulator 201 includes switching regulator controller 200, which is an embodiment of switching regulator controller 100 of FIG. 1. Switching regulator 201 may further include sense resistor Rsns, driver 260, transistor MI, diode D1, inductor I1, resistor R1, resistor R2, capacitor Cout, sense amp 250, and error amp 230. Also, reference voltage generator 210 includes DAC 211. Switch control circuit 220 may include OCP comparator 241, PWM comparator 242, and logic block 270. Although a particular embodiment of switching regulator 201 is illustrated in FIG. 2A, more or less components than illustrated in FIG. 2A may be employed in other embodiments. For example, although not shown FIG. 2A, switching regulator 201 may further include a compensation network coupled to error amplifier 230.

One embodiment switch control circuit 220 operates as follows. Logic block 270 provides switch control signal SCTL by performing pulse width modulation on signal raw_PWM, and may also perform other functions such as pulse skipping. In one embodiment, logic block 270 includes a counter, an RS flip-flop, pulse skipping logic, and over-current protection logic (not shown). Sense amplifier 250 is operable to provide current sense voltage Vcs. Also, OCP comparator 241 is operable to provide signal OCP based on a comparison of current sense voltage Vcs with threshold voltage Vthresh. Similarly, PWM comparator 242 is operable to provide signal raw_PWM based on a comparison of current sense voltage Vcs with error voltage Verr. In one embodiment, comparator 242 also receives a slope compensation ramp signal (not shown) for stabilization of current mode control schemes.

In one embodiment, logic block 270 includes a counter or a digital state machine operating in part like a counter to provide a count value that is employed for both pulse skipping and as the input to DAC 211.

For example, in one embodiment, the counter is a four-bit counter that operates as follows. The counter counts downward from 1111 to 0000 beginning at power-up. In this case, the count value represents the reference voltage attenuation. At 1111, Vref is $1/16$ of the steady state value; at 1110, Vref is at $2/16$ of the steady state value; and so on. Also, the value of the counter is number of pulses that logic block 270 skips. For example, when Vref is at 1/16 of the steady state value, 15 out of every 16 pulses are skipped; when Vref is at 2/16 of the steady state value, 14 out of every 16 pulses are skipped; and so on. However, the same number of bits need not be used for both pulse skipping and the reference voltage ramp. For example, in one embodiment, the digital state machine increments 16 levels of pulse skipping as DAC 211 increments through 128 levels. In this way, the voltage ramp is relatively smooth. In one embodiment, when Vref is at 1/8 of the steady state value, 7 out of every eight pulses are skipped.

In one embodiment, the counter is 8 bits and Vref provided as the output of DAC 211 goes beyond the steady-state reference voltage. In this embodiment, error amplifier 230 has three references: an external soft-start voltage, the soft-start Vref based on the output of DAC 211, and a steady-state reference voltage, and whichever reference is lowest is used by error amplifier 230.

In one embodiment, the count value is used to control the transconductance (gm) of error amplifier 230. This way, the bandwidth of the compensator does not exceed the startup switching frequency, which could otherwise result in instability. In one embodiment, three bits of the counter are used for the gm control of error amplifier 230.

In one embodiment, as illustrated in FIG. 2A, switching regulator 201 is a current-mode PWM regulator. If the on-time of a pulse in signal SCTL is too low, high-side sense current mode control can result in erratic switching behavior. However, pulse skipping performed by logic block 270 ensures that the on-time of pulses in signal SCTL are large enough to allow current sense voltage Vcs to settle and for blanking of switching noise so that erratic switching behavior does not result.

Figure 3:
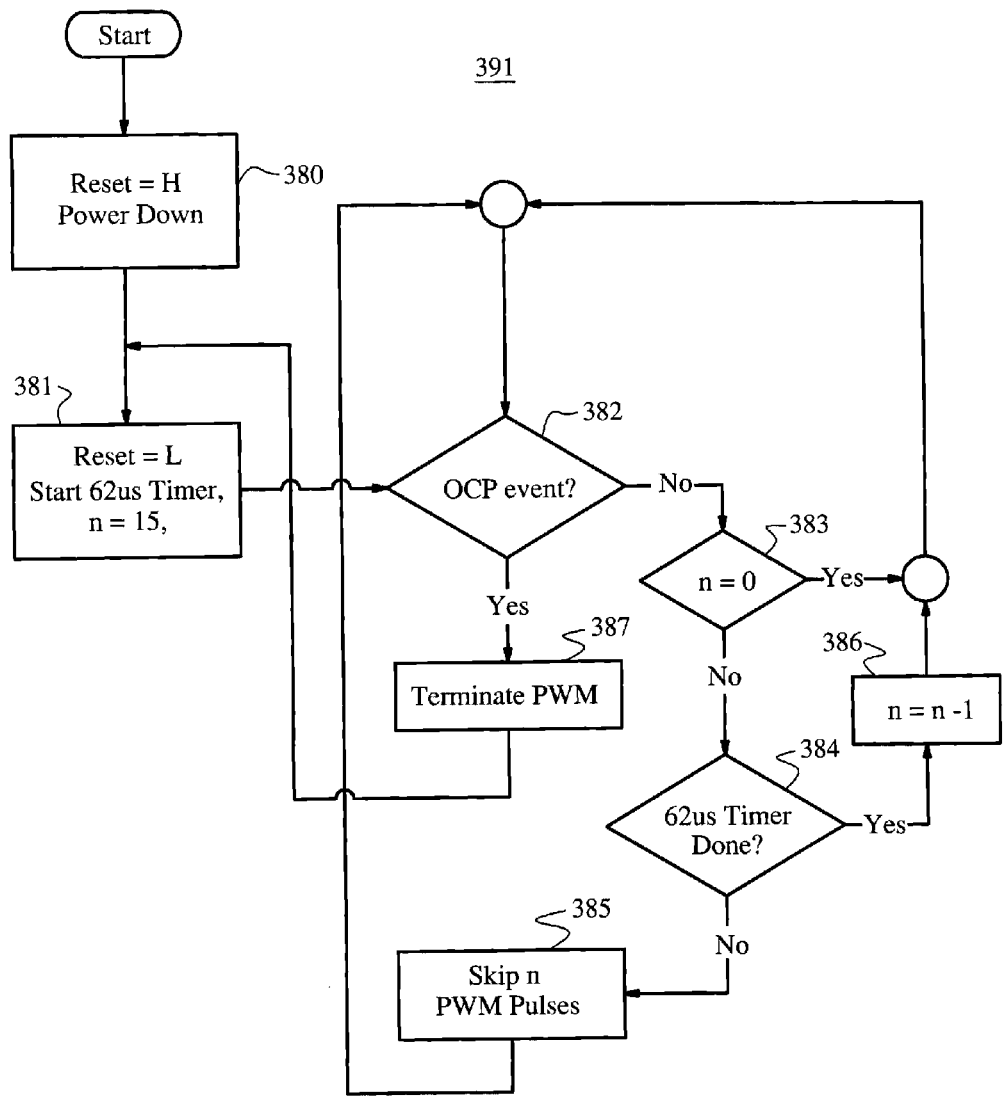
FIG. 3 illustrates a flow chart of an embodiment of a process.

As discussed above, over-current events may be responded to in different manners in different embodiments. In one embodiment of regulator 200, reference voltage Vref may be reset to zero responsive to an over-current event, resulting in a full soft-start recovery, as illustrated in FIG. 3 below in one embodiment.

Figure 4:
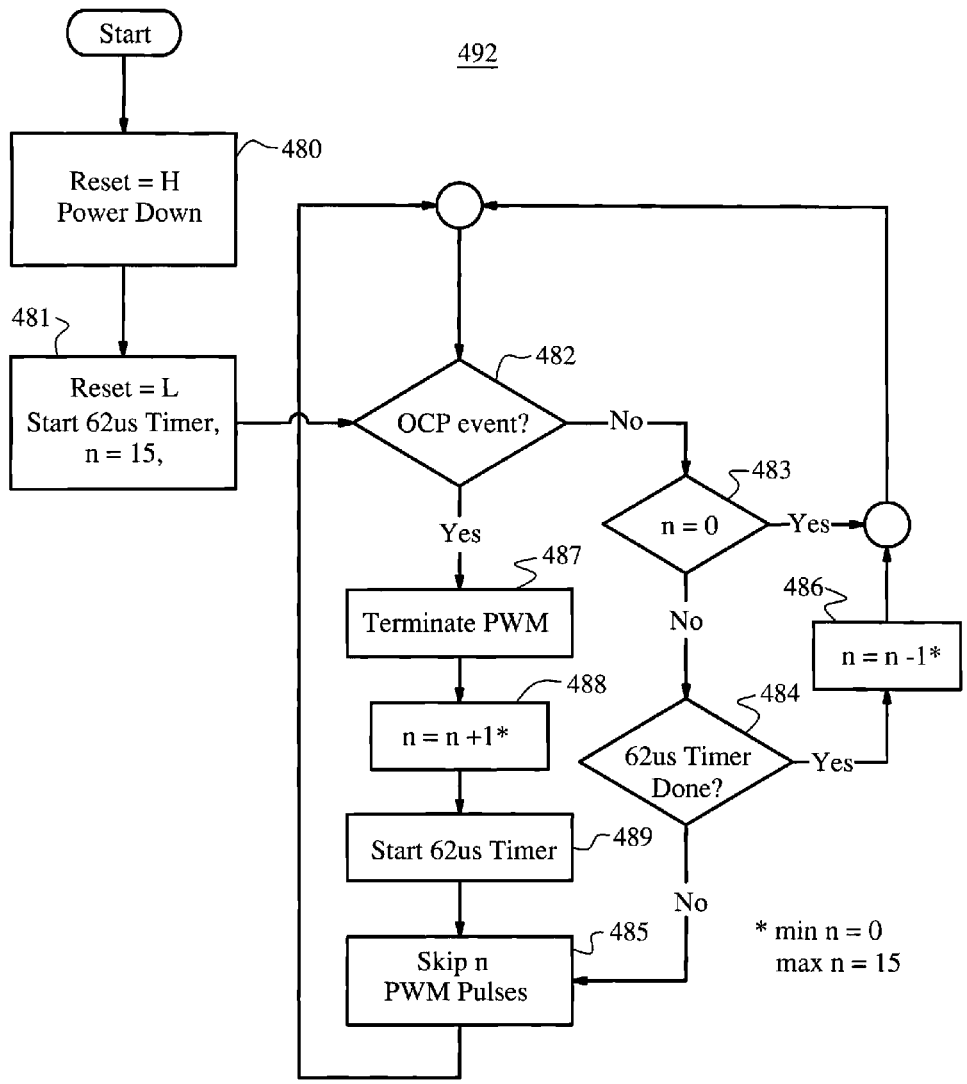
FIG. 4 shows a flow chart of another embodiment of the process of FIG. 3.

In another embodiment of regulator 200, over-current event may be responded to in a dynamic manner, as shown in FIG. 4 below in one embodiment. In one embodiment, the counter (state machine) is immediately decremented by over-current events and slowly incremented between over-current events as in soft-start. Accordingly, in this embodiment, light over-current events only reduce output voltage Vout slightly and for short durations relative to a hard short event which, in the extreme, results in effectively creating a full soft-start recovery. In both a soft-start and a response to an over-current event, the on-time of pulses in signal SCTL are substantially constant.

Although a particular embodiment of switching regulator 201 is illustrated in FIG. 2A, other embodiments may be employed within the scope and spirit of the invention. For example, although an asynchronously-rectified regulator is shown in FIG. 2A, in other embodiments, switching regulator 201 may be a synchronously-rectified regulator. Similarly, although a buck regulator is shown in FIG. 2A, in other embodiments, switching regulator 201 may be a boost regulator, a buck-boost regulator, or the like. Also, although a current-mode control regulator is shown in FIG. 2A, in other embodiments, switching regulator 201 may be a voltage-mode control regulator, or the like. These variations and other are within the scope and spirit of the invention.

Further, although a voltage divider (consisting of resistors R1 and R2) is used to provide feedback signal Vfb from output voltage Vout in the embodiment shown in FIG. 2A, in other embodiments, the voltage divider may be excluded and output voltage Vout may be used directly as the feedback voltage Vfb. Also, as discussed above, although an embodiment in which pulse skipping is employed to attenuate the frequency during soft start as shown in the embodiment illustrated in FIG. 2A, in other embodiments, attenuating the frequency during soft-start may be accomplished in a different manner than pulse skipping. Further, as discussed above, although a PWM architecture is illustrated in FIG. 2A, in other embodiments, a different architecture may be employed, such as an adaptive, feed-forward type constant-on time architecture. Additionally, although current sensing is accomplished with a sense resistor in the embodiment illustrated in FIG. 2A, in other embodiments, current sensing is not performed, or is performed in a different manner than using a sense resistor, such as using a sense transistor, using DCR sensing, or the like. These variations and others are within the scope and spirit of the invention. Everything discussed herein with regard to regulator 201 of FIG. 2A may be employed with regard to the switching frequency attenuation embodiments. In addition to switching frequency attenuation embodiments, dynamic over-current protection embodiments may also be employed, as described in greater detail below. Further, some embodiments employ both switching frequency attenuation and dynamic over-current protection.

Figure 2B:
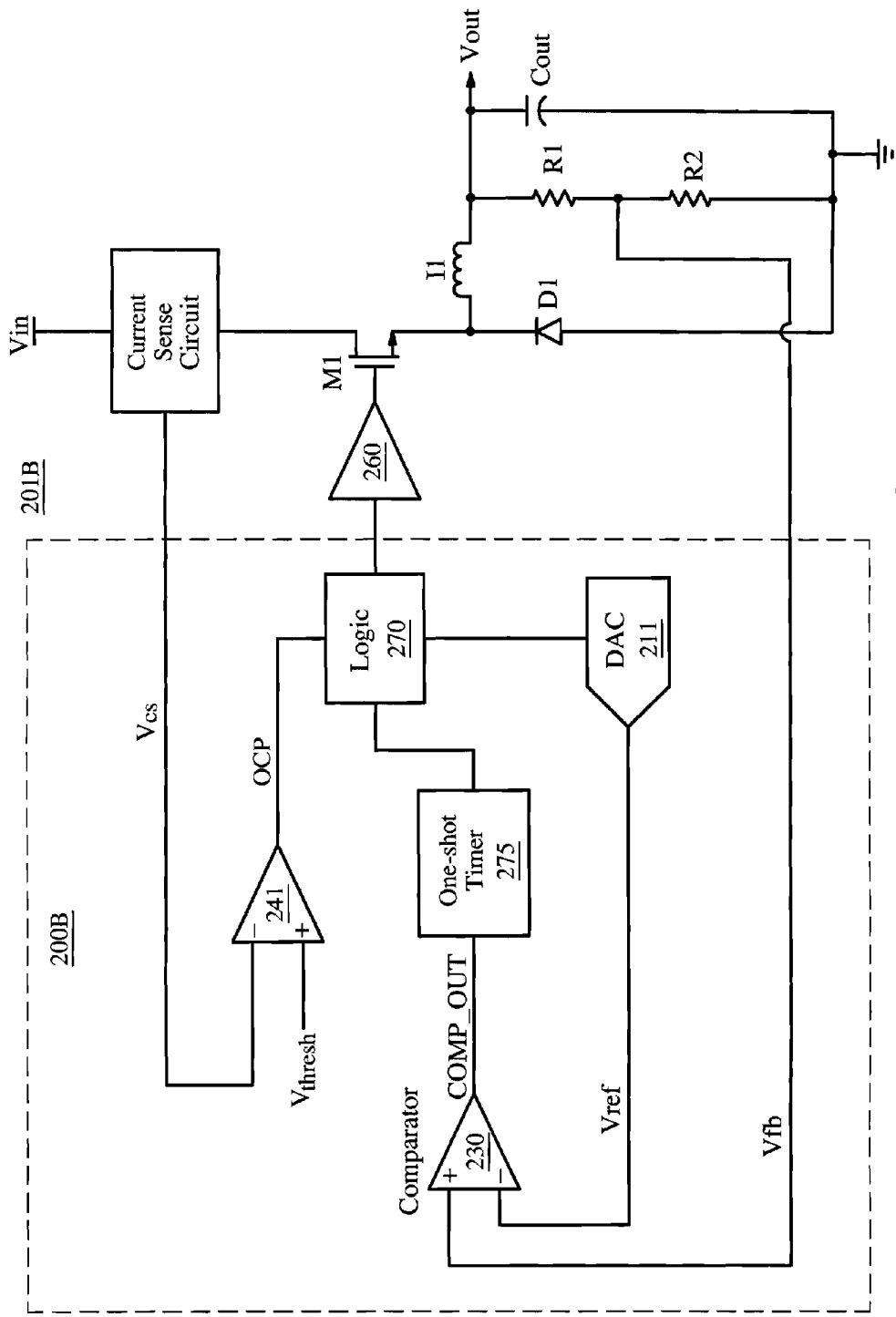
FIG. 2B illustrates a block diagram of an embodiment of regulator that includes another embodiment of the regulator controller of FIG. 1.

FIG. 2B illustrates a block diagram of an embodiment of regulator 201B. Switching regulator 201B includes switching regulator controller 200B, which is an embodiment of switching regulator controller 100 of FIG. 1. Circuit 201B employs dynamic over-current protection, but does not employ switching frequency attenuation. Although FIG. 2B illustrates a constant-on-time architecture, the invention is not so limited. The dynamic over-current protections scheme may be employed for virtually any regulator in which soft-start is used. In one embodiment, circuit 200B performs the process illustrated in FIG. 5 and described in greater detail below.

Figure 5:
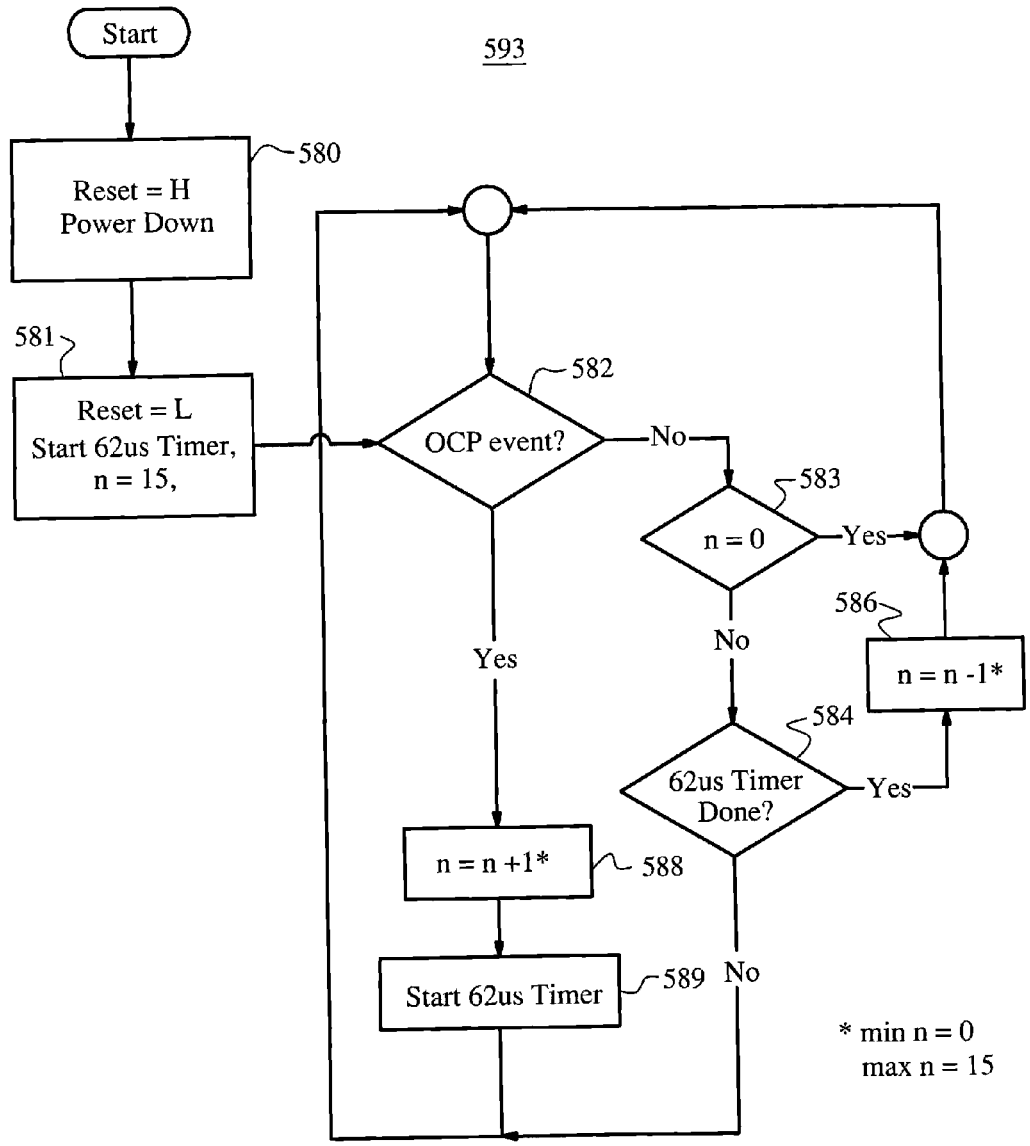
FIG. 5 shows a flow chart of an embodiment of a process for dynamic over-current protection.

FIG. 3 illustrates one embodiment of a process in which pulse skipping is employed and dynamic over-current protection is not employed. FIG. 4 shows an embodiment of a process in which both pulse skipping and dynamic over-current protection are employed. FIG. 5 illustrates an embodiment of a process in which dynamic over-current protection is employed and pulse skipping is not employed.

FIG. 3 illustrates a flow chart of an embodiment of process 391. After a start block, the process begins at block 380, where the switching regulator is powered down, and the reset signal is asserted. When the reset signal is de-asserted, the process then proceeds to block 381, where: a count value (n) is set to 15, and a timer is started. In one embodiment, the timer is a 62 μs timer. However, the invention is not so limited, and virtually any time period may be employed for the timer. For example, the designer may choose the amount of time for the timer based on the desired length of the soft-start.

The process then advances to decision block 382, where a determination is made as to whether an over-current protection (OCP) event has occurred. If not, the process proceeds to decision block 383, where a determination is made as to whether n=0. If not, the process proceeds to decision block 384, where a determination is made as to whether the timer has expired. If not, the process moves to block 385, where n out of every 16 pulses are skipped. The process then proceeds to decision block 382.

At decision block 384, if the timer has expired, the process advances to block 386, where n is decremented. The process then moves to decision block 382.

At decision block 383, if n=0, the process proceeds to decision block 382. At decision block 382, if an OCP event has occurred, the process advances to block 387, where pulse width modulation is immediately terminated. The process then moves to block 381.

FIG. 4 shows a flow chart of an embodiment of process 492. After a start block, the process begins at block 480, where the switching regulator is powered down, and the reset signal is asserted. When the reset signal is de-asserted, the process then proceeds to block 481, where n is set to 15, and the timer is started. The process then advances to decision block 482, where a determination is made as to whether an over-current protection (OCP) event has occurred. If not, the process proceeds to decision block 483, where a determination is made as to whether n=0. If not, the process proceeds to decision block 484, where a determination is made as to whether the timer has expired. If not, the process moves to block 485, where n out of every 16 pulses are skipped. The process then proceeds to block 485.

At decision block 484, if the timer has expired, the process advances to block 486, where n is decremented. The process then moves to decision block 482.

At decision block 483, if n=0, the process proceeds to decision block 482. At decision block 482, if an OCP event has occurred, the process advances to block 487, where pulse width modulation is immediately terminated until the start of the next pulse that is not skipped. The process then moves to block 488, where n is incremented. However, n is only incremented if n is below the maximum value (e.g. 15). In either case, the process then proceeds to block 489, where the timer is started. The process then moves to decision block 482.

Employing process 492, if the switching regulator has a load that would generate twice the over-current event at the nominal rated output voltage, the response of the switching regulator is to drop the output voltage to one-half of the nominal rated voltage, and the voltage remains at that value as long as the load remains. In this case, the switching regulator is still regulating at a steady-state DC voltage. Basically, the algorithm finds a value of n that is just below the threshold of over-current, and stays there, resulting in a steady-state voltage for Vout that can be used without resulting in over-current.

FIG. 5 shows a flow chart of an embodiment of process (593) for dynamic over-current protection. Process 593 may be performed for virtually any type of regulator for which soft-start is employed, including circuit 201B of FIG. 2B.

After a start block, the process begins at block 580, where the regulator is powered down, and the reset signal is asserted. When the reset signal is de-asserted, the process then proceeds to block 581, where: n is set to 15, and the timer is started. The process then advances to decision block 582, where a determination is made as to whether an over-current protection (OCP) event has occurred. If not, the process proceeds to decision block 583, where a determination is made as to whether n=0. If not, the process proceeds to decision block 584, where a determination is made as to whether the timer has expired. If not, the process moves to decision block 582.

At decision block 584, if the timer has expired, the process advances to block 586, where n is decremented. The process then moves to decision block 582.

At decision block 583, if n=0, the process proceeds to decision block 582. At decision block 582, if an OCP event has occurred, the process advances to block 588, where n is incremented. However, n is only incremented if n is below the maximum value (e.g. 15). In either case, the process then proceeds to block 589, where the timer is started. The process then moves to decision block 582.

Figure 6:
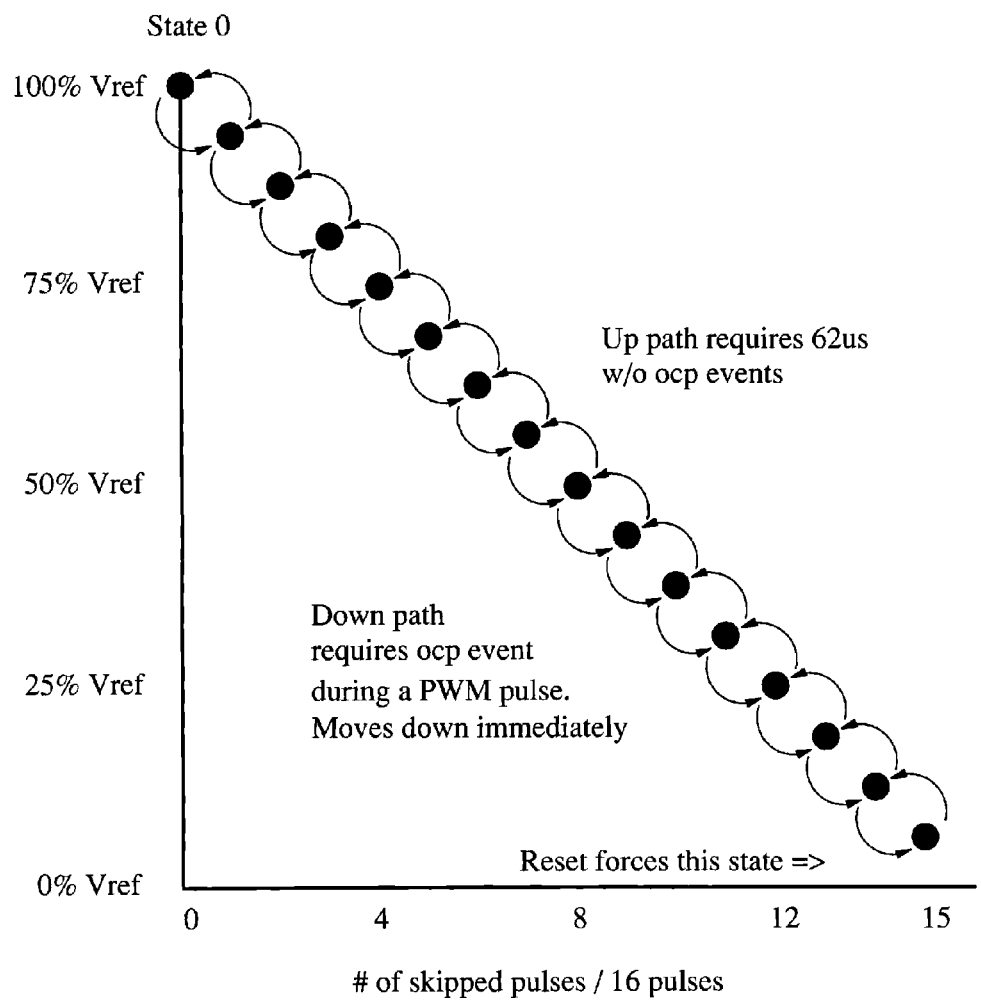
FIG. 6 illustrates a state diagram for an embodiment of the process of FIG. 4, in accordance with aspects of the present invention.

FIG. 6 illustrates a state diagram for an embodiment of process 492 of FIG. 4. FIGS. 3, 4, and 6 discuss an embodiment in which the same number of bits is employed for both pulse skipping and for the input to the DAC. However, as previously discussed, a different resolution may be employed for the voltage ramp than for the pulse skipping.

Accordingly, the incrementing described in FIGS. 4-6 may occur differently than shown. For example, rather than incrementing by one, n may increment by an integer greater than one. As another example, the incrementing of n for over-current events may occur in a more complex pattern. In one embodiment, n increments aggressively at first, and then less aggressively. In one embodiment, the pattern for incrementing n may be adaptive. These variations and others are within the scope and spirit of the invention.

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A switching regulator controller, comprising:
   a soft-start reference circuit that is operable to provide a reference voltage such that, at least during a soft start, the reference voltage is attenuated, and such that the reference voltage attenuation decreases during the soft start; and
   a switch control circuit that is operable to provide a switch control signal such that:
      during a steady state condition, a frequency of the switch control signal is approximately constant; and
      at least during the soft start, the switch control circuit attenuates the frequency of the switch control signal based on the reference voltage attenuation, wherein
   the switch control circuit is arranged to control the conversion of an input voltage into an output voltage such that the output voltage is regulated, and
   wherein the switch control circuit is arranged to provide the switch control signal such that, during the steady state condition, the frequency of the switch control signal is maintained substantially constant such that the switch control signal is substantially independent of the ratio of the output voltage to the input voltage.

2. The switching regulator controller of claim 1,
   wherein the soft-start reference circuit that is operable to provide a reference voltage such that:
      after a system reset, the reference voltage corresponds to an initial value;
      if an over-current protection signal is not asserted:
         the reference voltage ramps toward a final value;
      else if the over-current protection signal is asserted and the reference voltage approximately corresponds to the final value:
         the reference voltage is decremented to a voltage level that is in between a minimum value and the final value; and
         after the reference voltage is decremented, if the over-current event is no longer detected, the reference voltage ramps toward the final value;
      else if the over-current protection signal is asserted and the reference voltage is greater than the minimum value:
         the reference voltage is decremented.

3. The switching regulator controller of claim 1, wherein the switch control circuit is operable to provide the switch control signal such that, at least during the soft-start, the switch control circuit attenuates the frequency of the switch control signal such that the frequency of the switch control signal is roughly proportional to the reference voltage attenuation.

4. The switching regulator controller of claim 1, further comprising:
an error amplifier that is operable to receive: the reference voltage, and a feedback signal that is based, at least in part, on a regulated output voltage; and further operable to provide an error signal based, in part, on the reference voltage and the feedback signal, wherein the switch control circuit includes an oscillator that is operable to provide a clock signal; the switch control circuit is operable to perform pulse width modulation on the error signal to provide the switch control signal; the pulse width modulation is based, in part, on the clock signal; and wherein switch control circuit is operable to, at least during the soft start, attenuate the frequency of the switch control signal by modulating a frequency of the clock signal such that the frequency of the clock signal is approximately proportional to the reference voltage attenuation.

5. The switching regulator controller of claim 1, further comprising an error amplifier that is operable to receive: the reference voltage, and a feedback signal that is based, at least in part, on a regulated output voltage; and further operable to provide an error signal based, in part, on the reference voltage and the feedback signal, wherein the error amplifier is arranged such that, at least during the soft-start, a bandwidth of the error amplifier is adjusted in proportion to the reference voltage attenuation.

6. The switching regulator controller of claim 1,
wherein the switch control circuit is operable to, at least during the soft start, attenuate the frequency of the switch control signal by skipping a number of pulses of the switch control that is approximately proportional to the reference voltage attenuation;
the switch control circuit includes a counter that is operable to provide a count signal having at least a plurality of bits; and
wherein the switch control circuit is arranged such that some or all of the plurality of bits of the count signal are used to indicate the number of skipped pulses.

7. The switching regulator controller of claim 6, wherein the soft-start reference circuit includes a digital-to-analog converter that is operable to provide the reference voltage based, at least in part, on some or all of the plurality of bits of the count signal.

8. The switching regulator controller of claim 7, wherein the digital-to-analog converter is arranged such that at least three bits of the plurality of bits of the count signal are used to provide the reference voltage, and wherein the switch control circuit is arranged such that at least two bits of the plurality of bits of the counter signal are used for the pulse skipping.

9. The switching regulator controller of claim 7, further comprising an error amplifier that is operable to receive: the reference voltage, and a feedback signal that is based, at least in part, on a regulated output voltage; and further operable to provide an error signal based, in part, on the reference voltage and the feedback signal, wherein the error amplifier is arranged such that, at least during the soft-start, a bandwidth of the error amplifier is adjusted based on at least two bits of the plurality of bits of the counter signal.

10. The switching regulator controller of claim 6, wherein switch control logic circuit is arranged such that, if an over-current protection event occurs, the count signal increments one level, such that at least four levels of the count signal are employed for over-current protection.

11. The switching regulator controller of claim 10, wherein the digital-to-analog converter is arranged such that at least three bits of the plurality of bits of the count signal are used to provide the reference voltage, and wherein the switch control circuit is arranged such that at least two bits of the plurality of bits of the count signal are used for the pulse skipping, and such that at least three bits of the count signal are employed for over-current protection.

12. A regulator controller, comprising:
an over-current protection circuit that is operable to detect an over-current event, and to assert an over-current protection signal if an over-current event is detected; and
a soft-start reference circuit that is operable to provide a reference voltage such that:
if a system reset occurs:
the reference voltage is reset to an initial value;
if the over-current protection signal is not asserted:
the reference voltage ramps toward a final value;
else if the over-current protection signal is asserted and the reference voltage approximately corresponds to the final value:
the reference voltage is decremented to a voltage level that is in between a minimum value and the final value; and
after the reference voltage is decremented, if the over-current event is no longer detected, the reference voltage ramps toward the final value;
else if the over-current protection signal is asserted and the reference voltage is greater than the minimum value:
the reference voltage is decremented.

13. The regulator controller of claim 12, further comprising:
a counter, wherein the counter is operable to provide a count signal having a count value, the soft-start reference circuit includes a digital-to-analog converter that is operable to convert the count signal into the reference voltage, and wherein the counter is operable to provide the count signal such that:
if the system reset occurs:
the count value is reset an initial count value;
if the over-current protection signal is not asserted:
the counter counts toward a final count value;
else if the over-current protection signal is asserted and the reference voltage does not correspond to the final count value:
the counter counts toward the initial value using at least two bits of the count signal,
wherein the digital-to-analog converter is operable to provide the reference voltage at the final value if the count value corresponds to the final count value, and wherein the digital-to-analog converter is operable to provide the reference voltage at the initial value if the count value corresponds to the initial count value.

14. The regulator controller of claim 13, further comprising:
a pulse modulation circuit that is operable to perform pulse modulation based, in part, on the reference voltage and at least one of a load current and an output voltage; and to perform the pulse modulation such that, if the count value does not correspond to the final value, the pulse modulation skips a number of pulses that is proportional to the count value.

15. The regulator controller of claim 13, wherein the counter is arranged such that the counting toward the final count value uses at least two bits of the count value; and such that the counting toward the initial value uses at least two bits of the count value, such that counting toward the initial value uses at least three levels.

16. The regulator controller of claim 15, wherein the counter is operable to count toward the final count value using at least three bits, such that counting toward the initial value involves at least eight levels; and wherein the counter is operable to count toward the initial value using at least four levels.

17. A method for regulation, comprising:
providing an error signal that is based, at least in part, on a reference voltage and at least one of an output voltage or a load current;
providing a pulse modulation output signal by performing pulse modulation based, at least in part, on the error signal, wherein providing the switch control signal includes performing pulse modulation; and
providing the reference voltage such that:
if a system reset occurs:
the reference voltage is reset to an initial value;
if no over-current event is detected:
the reference voltage ramps toward a final value;
else if an over-current event is detected and the reference voltage approximately corresponds to the final value:
the reference voltage is decremented to a voltage level that is in between a minimum value and the final value; and
after the reference voltage is decremented, if the over-current event is no longer detected, the reference voltage ramps toward the final value;
else if an over-current event is detected and the reference voltage is greater than the minimum value:
the reference voltage is decremented.

18. The method of claim 17, wherein providing the reference voltage includes:
providing a count value; and
converting the count signal into the reference voltage, wherein providing the count value includes:
if the system reset occurs:
the count value is reset to an initial count value;
if no over-current event is detected:
the count value counts toward a final count value;
else if an over-current event is detected and the reference voltage does not correspond to the final count value:
the count value counts toward the initial value using at least two bits of the count signal, the digital-to-analog converter is operable to provide the reference voltage at the final value if the count value corresponds to the final count value, and wherein the digital-to-analog converter is operable to provide the reference voltage at the initial value if the count value corresponds to the initial count value.

19. The method of claim 18, wherein the pulse modulation is performed such that, if the count value does not correspond to the final value, the pulse modulation skips a number of pulses that is proportional to the count value.

20. The method of claim 18, further comprising starting a timer after the system reset, and starting the timer each time the counter counts toward the final value, wherein the counting toward the final count value uses at least four bits of the count value, such that counting toward the final count value involves at least eight levels; and wherein the counting toward the initial value uses at least three bits of the count value, such that counting toward the initial value uses at least three levels, wherein counting toward the final count value includes:
if the over-current protection signal is not asserted from the time the timer is started until the timer expires, incrementing one level toward the final value after the timer expires, and wherein counting toward the initial value in response to an over-current event is roughly immediate, such that the reference voltage drops relatively quickly through at least eight voltage levels if an over-current event occurs at each of the at least eight voltage levels, and such that the reference voltages rises at a soft-start rate of voltage increase toward the final value as long as no over-current event is detected.

* * * * *